United States Patent [19]
Mirskiy et al.

[11] Patent Number: 6,111,365
[45] Date of Patent: Aug. 29, 2000

[54] FAST STARTING, SURGE LIMITED, ELECTRONIC BALLAST

[75] Inventors: Grigoriy Mirskiy, Vernon Hills; Michael W. Bandel, Elk Grove; Kent E. Crouse, Schaumburg; Peter W. Shackle, Arlington Heights, all of Ill.

[73] Assignee: Energy Savings, Inc., Schaumburg, Ill.

[21] Appl. No.: 09/394,865

[22] Filed: Sep. 13, 1999

[51] Int. Cl.[7] .................................................. H05B 41/16
[52] U.S. Cl. .......................... 315/247; 315/127; 315/219; 315/307; 315/209 R; 315/DIG. 7
[58] Field of Search .............................. 315/247, 209 R, 315/244, 307, 127, 219, DIG. 4, DIG. 7; 363/89, 17, 124, 125, 132; 323/211, 222, 223, 285

[56] References Cited

U.S. PATENT DOCUMENTS

| | | | |
|---|---|---|---|
| 5,612,609 | 3/1997 | Choi | 323/210 |
| 5,925,990 | 7/1999 | Crouse et al. | 315/307 |
| 5,930,130 | 7/1999 | Katyl et al. | 363/53 |
| 5,936,357 | 8/1999 | Crouse et al. | 315/247 |
| 5,973,455 | 10/1999 | Mirskiy et al. | 315/105 |

*Primary Examiner*—Haissa Philogene
*Attorney, Agent, or Firm*—Paul F. Wille

[57] ABSTRACT

An electronic ballast includes a zener diode in series with the bulk capacitor of the ballast to provide a charging voltage for a small capacitor that powers a power factor correction circuit within the ballast. A SCR in parallel with the zener diode shuts off the zener diode after the power factor correction circuit begins operation.

10 Claims, 2 Drawing Sheets

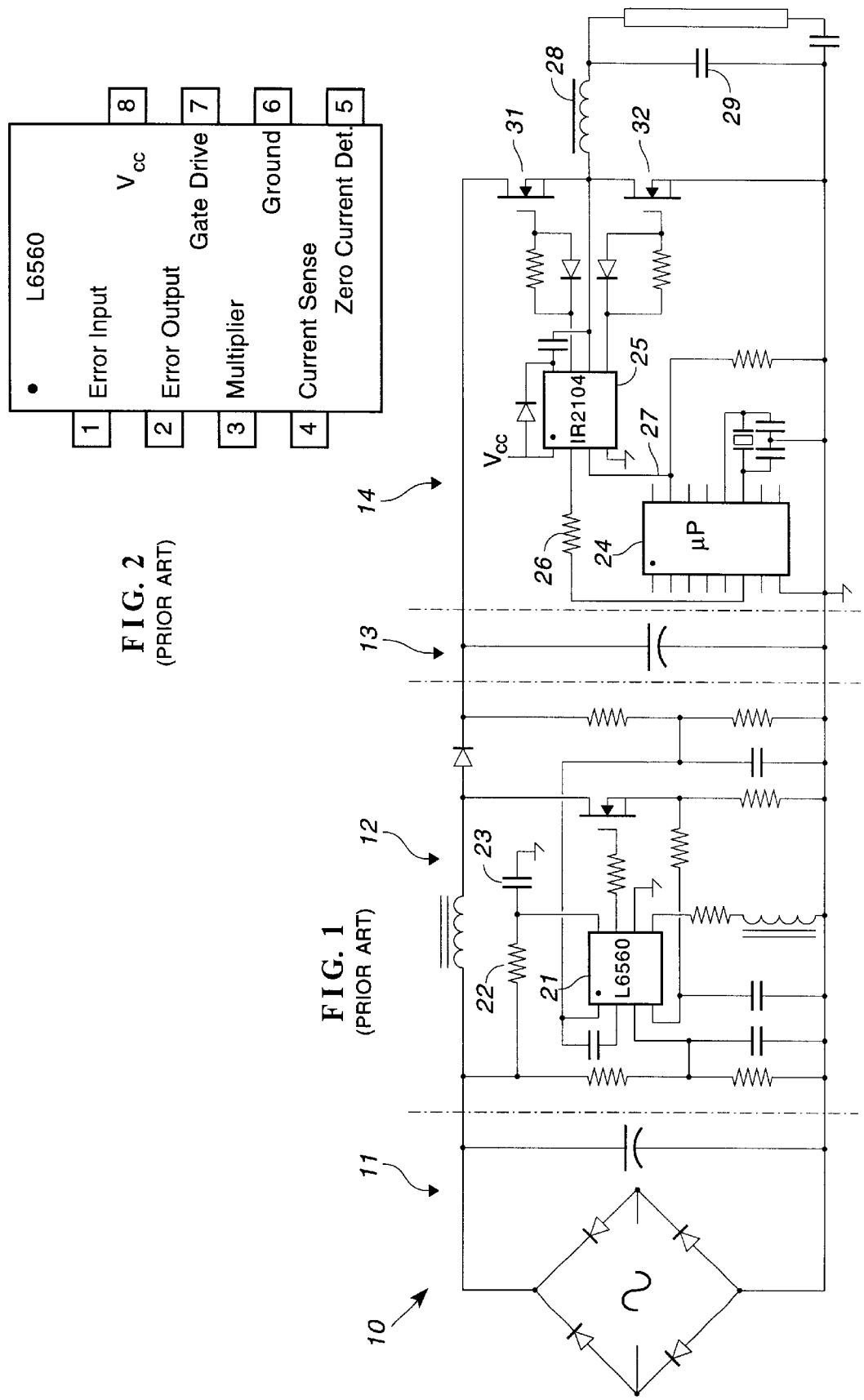

FAST STARTING, SURGE LIMITED, ELECTRONIC BALLAST

BACKGROUND OF THE INVENTION

1. Field of Invention

This invention relates to surge limited electronic ballasts for gas discharge lamps and, in particular, to a ballast that can rapidly provide low voltage for the electronic devices within the ballast despite the surge limiting circuitry.

2. Prior Art

A gas discharge lamp, such as a fluorescent lamp, is a non-linear load to a power line, i.e. the current through the lamp is not directly proportional to the voltage across the lamp. Current through the lamp is zero until a minimum voltage is reached, then the lamp begins to conduct. Once the lamp conducts, the current will increase rapidly unless there is a ballast in series with the lamp to limit current.

A resistor can be used as a ballast but a resistor consumes power, thereby decreasing efficiency, measured in lumens per watt. A "magnetic" ballast is an inductor in series with the lamp and is more efficient than a resistor but is physically large and heavy. A large inductor is required because impedance is a function of frequency and power lines operate at low frequency (50–60 Hz.)

An electronic ballast typically includes a rectifier for changing the alternating current (AC) from a power line to direct current (DC) and an inverter for changing the direct current to alternating current at high frequency, typically 25–60 kHz. Since a frequency much higher than 50–60 Hz. is used, the inductors in an electronic ballast can be much smaller than the inductor in a magnetic ballast.

Converting from alternating current to direct current is usually done with a full wave or bridge rectifier. A filter capacitor on the output of the rectifier stores energy for powering the inverter. Some ballasts include a boost circuit between the rectifier and the filter capacitor for increasing the voltage to the lamp. The filter capacitor has a large capacitance, on the order of 15 $\mu$f, and represents a low impedance to the AC line voltage. When an electronic ballast is first turned on, there is typically a large current surge through the rectifier to the filter capacitor, charging the capacitor. When the filter capacitor charges to approximately the nominal voltage of the AC power line, the current has decrease substantially.

Many electronic ballast use what is known as a "flyback" boost circuit in which the energy stored in an inductor is supplied to the filter capacitor as small pulses of current at high voltage, utilizing the $\delta i/\delta t$ characteristic of an inductor. U.S. Pat. No. 3,265,930 (Powell) discloses such a ballast. An inductor between the bridge rectifier and the filter capacitor in a ballast does not limit surge current because the inductor is relatively small, on the order of two millihenries, and has a DC resistance of only a few ohms.

A modern electronic ballast typically includes an integrated circuit in the front end of the ballast to operate the boost circuit and provide power factor correction. "Power factor" is a figure of merit indicating whether or not a load in an AC circuit is equivalent to a pure resistance, i.e., indicating whether or not the voltage and current are sinusoidal and in phase. It is preferred that the load be the equivalent of a pure resistance (a power factor equal to one). Many semiconductor devices not only provide suitable AC to DC conversion but provide a "universal" front capable of being connected directly to any line voltage between 120 and 277 volts.

Particularly at higher line voltages, the surge current can be considerable and some means for limiting the in-rush surge current must be provided. Even at lower line voltages, current limiting circuitry is desirable to minimize stress on the active and passive electrical components within an electronic ballast. Having limited the available current when a ballast is first turned on has the effect of significantly increasing the starting time for the electronics within a ballast. (Lamp starting is a separate consideration.) Typically, the low voltage for powering the integrated circuits within an electronic ballast is derived from the normal operation of the boost circuit. When in-rush current is limited, the charging time for all capacitances is increased. Worse, the starting time may become voltage dependent, being longer for lower line voltages.

One must be cautious about adding circuitry to a ballast to solve each new problem as it arises. Not only are the cost and complexity of the ballast increased but the added components can cause an increase in the power dissipated by the ballast, thereby decreasing the efficiency of the ballast.

In view of the foregoing, it is therefore an object of the invention to provide a fast starting, surge limited, electronic ballast.

Another object of the invention is to provide an electronic ballast in which the starting time is consistent, reproducible, and independent of line voltage.

A further object of the invention is to provide a fast starting, surge limited, electronic ballast with as few additional components as possible.

Another object of the invention is to provide an efficient, fast starting, surge limited, electronic ballast.

SUMMARY OF THE INVENTION

The foregoing objects are achieved in this invention in which a zener diode is in series with the bulk capacitor of an electronic ballast to provide a charging voltage for a small capacitor that powers a power factor correction circuit within the ballast. An SCR in parallel with the zener diode shuts off the zener diode after the power factor correction circuit begins operation.

BRIEF DESCRIPTION OF THE DRAWINGS

A more complete understanding of the invention can be obtained by considering the following detailed description in conjunction with the accompanying drawings, in which:

FIG. 1 is a schematic of a microprocessor controlled, electronic ballast;

FIG. 2 is a diagram showing the pin-outs of an integrated circuit used for controlling the boost portion of an electronic ballast;

DETAILED DESCRIPTION OF THE INVENTION

Figure 3:
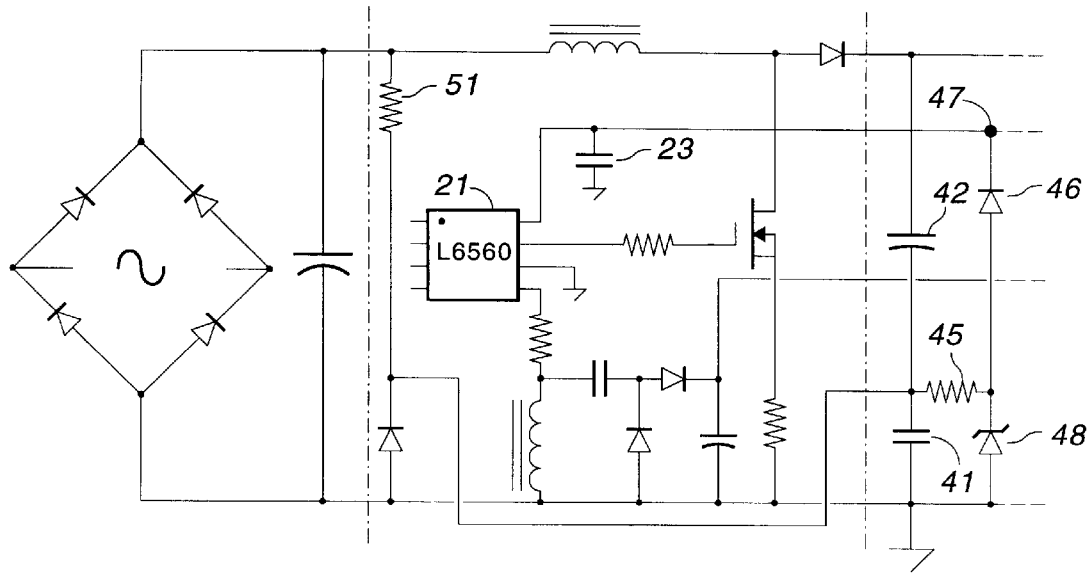
FIG. 3 is a schematic of a known circuit for providing power to the power factor controller chip.

FIG. 1 illustrates a microprocessor controlled, electronic ballast constructed in accordance with the prior art. In the figures, pin 1 of each integrated circuit is indicated by a small dot and the pins are numbered consecutively counterclockwise. Ballast 10 includes rectifier section 11 for producing DC from line voltage, boost section 12 for increasing the DC voltage and providing power factor correction, storage section 13 for storing energy to drive a lamp, and inverter section 14 for driving a lamp.

Boost section 12 includes boost controller 21 implemented as an L6560 power factor correction circuit as sold by SGS-Thomson Microelectronics. FIG. 2 is a diagram of the pin designations for this particular integrated circuit. Other power factor correction circuits could be used instead. Boost section 12 is essentially the same as the circuit recommended in the data sheets accompanying the L6560 integrated circuit.

Energy storage section 13 is illustrated as including a single, so-called "bulk" capacitor. Several bulk capacitors connected in parallel could be used instead. The rectifier, boost, and bulk capacitor together are the "front end" of an electronic ballast, an AC to DC converter for producing high voltage DC to power inverter 14.

Microprocessor 24 is coupled to two inputs of driver circuit 25. Specifically, high frequency pulses are coupled through resistor 26 through pin 2 of driver 25. Pin 3 of driver 25 is a disable input and is coupled to another output of microprocessor 24. In the event of a fault, disable line 27 is brought low, thereby shutting off the inverter. Inverter 14 includes a half bridge, series resonant, direct coupled output including inductor 28 and resonant capacitor 29. Switching transistors 31 and 32 conduct alternately to produce a series of high voltage pulses that inductor 28 and capacitor 29 convert into sinusoidal alternating current.

When ballast 10 is first turned on, rectified AC flows through resistor 22 to capacitor 23, charging the capacitor and providing operating power for controller 21. While this arrangement is simple and reasonably effective, resistor 22 dissipates an unacceptable amount of power. The circuit illustrated in FIG. 3 overcomes this problem by having capacitor 41 connected in series with bulk capacitor 42. The in-rush current charges capacitor 41 quickly.

The voltage on capacitor 41 is coupled through resistor 45 and diode 46 to node 47. Node 47 is coupled to capacitor 23 and controller 21. The voltage on the anode of diode 46 is limited by zener diode 48. Some current is also supplied to capacitor 41 through resistor 51, which provides a slow back-up mechanism in case capacitor 41 becomes discharged while capacitor 42 is charged. While more effective than the converter circuit illustrated in FIG. 1, the circuitry of FIG. 3 has difficulty if in-rush surge limiting circuitry is added to a ballast because the circuit depends upon there being an in-rush surge current for proper operation.

Figure 4:
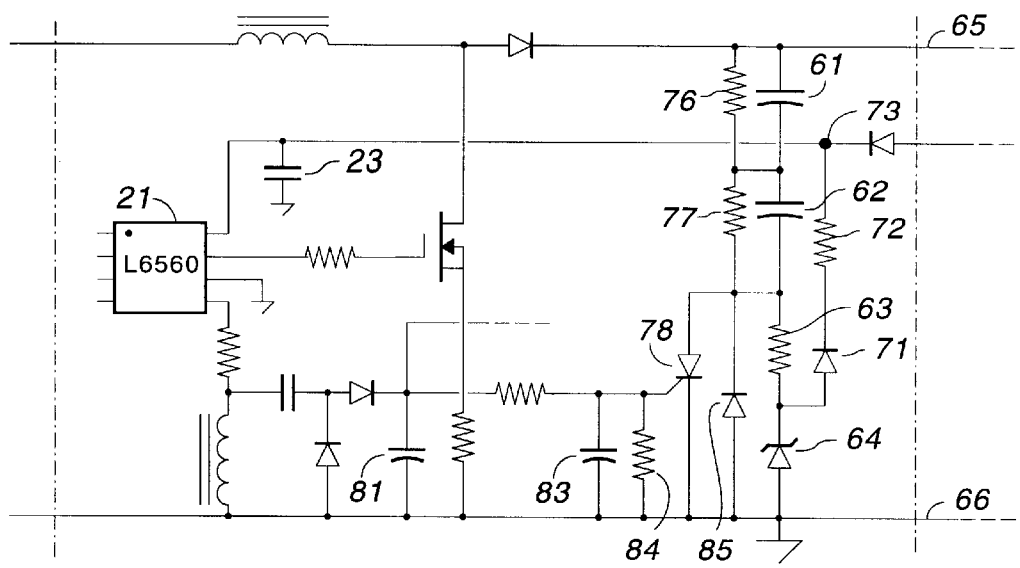
FIG. 4 is a schematic of the boost section of a ballast constructed in accordance with a preferred embodiment of the invention.

FIG. 4 illustrates a power factor correction chip powered in accordance with a preferred embodiment of the invention. In this embodiment, bulk capacitors 61 and 62 are connected in series with resistor 63 and zener diode 64 between high voltage rail 65 and common or ground rail 66. In-rush surge current is limited by resistor 63. Only one bulk capacitor is necessary. Two bulk capacitors are used to divide the high voltage between two components, thereby reducing the necessary voltage rating.

During the first few milliseconds after power is applied, in-rush surge current flows from high voltage rail 65 through resistor 63, diode 71, and resistor 72 to begin charging capacitor 23. Zener diode 64 conducts within a few milliseconds and limits the voltage coupled to node 73, preferably to about twenty-four volts. Capacitor 23 continues to charge and, at approximately fifteen volts, controller 21 begins operating. Thus, one resistor, one capacitor, and the time constant associated therewith, are eliminated in the embodiment of FIG. 4. In addition, the charging voltage is independent of the applied voltage, thereby assuring a consistent starting time.

Resistor 72 provides current limiting but the main purpose of resistor 72 is to protect controller 21 from transients. SCR 78 is coupled in parallel with resistor 63 and zener diode 64. After controller 21 starts operating, the output voltage on capacitor 81 is coupled to the gate of SCR 78, causing the SCR to conduct. When SCR 78 conducts, zener diode 64 shuts off and controller 21 is dependent upon other sources coupled to capacitor 81 to supply current to node 73. Diode 71 prevents resistor 63 and SCR 78 from bleeding current away from node 73.

Resistors 76 and 77 are preferably equal in value, as are capacitors 61 and 62. Resistors 76 and 77 help to equalize the charging of the capacitors during startup. Capacitor 83 and resistor 84 provide filtering to assure stable triggering of the SCR. Diode 85 is coupled anti-parallel with SCR 78 and conducts current when capacitors 61 and 62 are discharging.

Resistors 76 and 77 serve an additional function in the event that the ballast is restarted with the bulk capacitors charged; e.g., when a lamp is replaced without shutting off the power. Without an in-rush current, zener diode 64 is not conducting and other sources of current are shut off, because a lamp-out condition had been detected. Thus, no current is flowing into node 73 except that from resistors 76, 77, and 63. The trickle of current is sufficient to charge capacitor 23 in one hundred milliseconds or so. This delay is nominal and is not noticeable outside the laboratory.

The invention thus provides a fast starting, surge limited, electronic ballast in which the starting time is consistent, reproducible, and independent of line voltage. Few additional components are needed, some existing components are eliminated, and the ballast operates as efficiently as it did before the modification.

Having thus described the invention, it will be apparent to those of skill in the art that various modifications can be made within the scope of the invention. For example, any suitable semiconductor switch can be substituted for SCR 78. Power factor correction devices that can be substituted for the named device are commercially available from several manufacturers. The power factor correction circuit can implement a buck converter, a buck-boost converter, or any one of several other well known topologies.

What is claimed is:

1. An electronic ballast for a gas discharge lamp, said ballast comprising:
   a converter section having a line voltage input, a high voltage rail, and a common rail and including a bulk capacitor and a zener diode coupled in series between said high voltage rail and said common rail;
   an inverter section coupled to said high voltage rail and common, said inverter section including at least one AC output for coupling to said lamp.

2. The electronic ballast as set forth in claim 1 wherein:
   said converter includes a power factor control device having a supply input and a storage capacitor coupled to the supply input for providing power to said device; and
   said zener diode is coupled to said storage capacitor.

3. The electronic ballast as set forth in claim 2 and further including a diode coupled anti-parallel with said zener diode.

4. The electronic ballast as set forth in claim 1 wherein said converter further includes:
   a resistor coupled in series with said bulk capacitor and said zener diode; and an SCR coupled in parallel with said series coupled resistor and zener diode;

wherein said resistor limits in-rush surge current and said SCR short circuits said resistor when said ballast is running.

5. The electronic ballast as set forth in claim 4 wherein said converter further includes:

a power factor control device having a supply input;

a storage capacitor coupled to said supply input for providing power to said device; and wherein said zener diode is coupled to said storage capacitor.

6. The electronic ballast as set forth in claim 5 wherein said converter further includes a resistor coupled in parallel with said bulk capacitor for providing a resistive path from said high voltage rail to said storage capacitor.

7. The electronic ballast as set forth in claim 6 and further including a diode coupled anti-parallel with said SCR.

8. In an electronic ballast including a surge protected converter section having a power factor control device, a bulk capacitor coupled between a high voltage rail and common, and an inverter section coupled to said high voltage rail and common, said inverter section including at least one AC output for powering a gas discharge lamp, characterized in that:

a zener diode coupled in series with said bulk capacitor and coupled to said power factor control device for supplying power to said device at least during a brief interval after power is applied to said ballast.

9. The ballast as set forth in claim 8 and further including a semiconductor switch coupled in parallel with said zener diode for short circuiting said zener diode after said brief interval.

10. The electronic ballast as set forth in claim 9 and further including a diode coupled anti-parallel with said SCR.

* * * * *